Patented May 14, 1946

2,400,454

UNITED STATES PATENT OFFICE 2,400,454

METHOD OF TREATING DAIRY PRODUCTS

Niels P. Christensen, University City, and Roland E. Sturhahn, Webster Groves, Mo.

No Drawing. Application September 8, 1944, Serial No. 553,282

15 Claims. (Cl. 99—61)

This invention relates to the processing of dairy products and more particularly to a method for removing foreign odors therefrom.

Among the objects of this invention are the provision of a method for processing dairy products to remove foreign odors; the processing of dairy products to remove foreign odors without introducing other undesired odors; the provision of a method for the removal of foreign odors and simultaneously deterring subsequent deterioration; and the provision of a process of the type indicated which may be carried out without the use of special equipment to provide dairy products of high quality. Other objects will be in part apparent and in part pointed out hereinafter.

The invention accordingly comprises the steps and sequence of steps, and features of manipulation, which will be exemplified in the methods hereinafter described, and the scope of the application of which will be indicated in the following claims.

It is well known that dairy products are apt to pick up foreign odors and flavors from their environment as well as to develop a high bacteria count, which itself results in unwanted foreign odors. For example, milk and cream are produced on a farm and in many instances under unsatisfactory and unsanitary conditions. The unpleasant foreign odor and flavor are produced not only by bacterial development but also by the carelessness of the farmer in leaving vessels or utensils in barns or places where the milk or cream absorb barn and musty flavors. Also, milk or cream at certain times of the year, particularly in the fall or spring, because of certain types of weeds eaten by the cow, has an odor of onion or garlic. In order to produce first class dairy products from such milk or cream, the foreign or off odors and flavors must be removed.

It has been attempted to remove such foreign odors and flavors with a chloro antiseptic such as chloramine-T and chloramine-B. Such treatment does remove foreign odors and flavors but imparts to the dairy product an odor or taste of chlorine, which is as objectionable as the originally present foreign odor or taste in many instances.

In accordance with the present invention it has been found that foreign odors and tastes present in lacteal dairy products can not only be effectively removed without leaving an undesired odor or taste of a different type, but that in addition the treated dairy product is less subject to deterioration and has an improved tone.

According to the present invention, foreign odors and objectionable flavors are removed from dairy products by mixing the dairy product with a diketone of the class exemplified by diacetyl, dimethyl diketone,

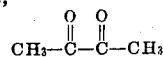

and its homologues, such as 2,3-pentadione, 2,3-hexadione, 3,4-hexadione and 3,4-heptadione. Diacetyl may be employed alone or it may be mixed with a proportion of one or more of its homologues.

The diketone may be and desirably is incorporated in a solution of a suitable food acid such as citric, acetic, butyric and lactic. Likewise, the diketone may be combined with a lactic ferment culture or one of the other milk cultures bacterially developed for use with dairy products.

It has been found that the addition of diacetyl and other diketones when mixed with dairy products containing foreign odors and foreign flavors substantially completely removes the foreign odor or flavor. This is accomplished without imparting an undesired foreign odor or flavor of another type, but on the contrary the flavor and aroma of the dairy product so treated is enhanced. Moreover, a better finished product with improved keeping qualities is obtained.

As stated, diacetyl can be used by itself or may be combined with one or more of its homologues. Typical proportions for such combinations are 2 parts by weight of 2,3-pentadione with 24 parts by weight of diacetyl; or 2 parts by weight of 2,3-hexadione with 24 parts by weight of diacetyl.

The following examples are merely illustrative:

Example 1

Off flavored milk or cream, as received in the creamery, is treated in the vat before any heat is applied, with an aqueous solution of diacetyl. The solution has a concentration of approximately 1¼% of diacetyl and is added in sufficient quantities to provide approximately 100 parts per million by weight of the milk or cream to be treated. The solution of diacetyl is mixed with the milk or cream during agitation, and the addition is continued until the off odors disappear and a slight odor of diacetyl remains. In this way the precise amount of diacetyl solution to be added may be determined by the off flavor or odor which is present.

The milk is then subjected to the customary processing steps such as pasteurization, etc. It will be found that not only have the off flavor and off odor been eliminated, but the finished product is clean and rich, free from any trace of odor of diacetyl and has improved keeping qualities.

Where the milk or cream has feed flavors such as onion or garlic, the dairy product is preferably first treated with a chloro antiseptic such as one of the chloramine groups.

*Example 2*

Milk or cream which has a flavor of onion or garlic is treated in the cans, as received at the creamery, with an aqueous solution of chloramine-T. This solution is added slowly in small amounts while the cream or milk is agitated, until the off flavor and odor have been removed. At this stage the milk or cream will have a slight chlorous flavor similar to that of city drinking water that has been chlorinated. This, if not removed, might have an unpleasant effect. The treated milk or cream is then processed as described in Example 1 above, the chlorous flavor being the "off flavor."

The diacetyl treated product is clean and rich with no trace of the chlorous flavor or the diacetyl odor or flavor. In addition it has improved keeping qualities.

The chloramine treatment may be carried out in the vat before any heat is applied instead of in the cans if desired, and chloramine-B may be substituted for chloramine-T.

In order to obtain best results these steps should be carried out as given above. No heat should be applied to the milk or cream in the vat until all the undesirable odors and flavors have been removed. The time for this may be from one-half to one hour, after which the milk or cream is titrated to determine its acidity, and a suitable medium is added for reducing the acidity to 0.18%–0.20%. The milk or cream is then heated to a temperature of 145–150° F. by the vat method or to a temperature of 200–210° F. by the flash method, and then promptly cooled as quickly as possible. The milk or cream is preferably left in the vat for at least three hours after it has cooled to churning temperature, before the churning operation is performed.

The concentration of the diketone such as diacetyl in the aqueous solution may be varied substantially. It is preferred that the solution contain at least approximately 5 cc. of 98% diacetyl per gallon of water. The concentration should not preferably substantially exceed 200 cc. of 98% diacetyl per gallon of water.

As stated above the diketone such as diacetyl is preferably added during agitation until the off odors and flavors have been removed. This requires in general not substantially more than 100 parts per million by weight of diacetyl. Where the off odors or flavors are relatively weak, or where a preliminary treatment with a chloro antiseptic such as one of the chloramines is employed, a smaller proportion of diacetyl is required. For very strong odors or flavors larger proportions are needed, but not substantially in excess of 200 parts per million should be employed.

The diketone may, and preferably is combined with a food acid such as citric. In such instances the proportion of diacetyl or other diketone to the cream or milk will remain substantially constant, but the product obtained will have a better tone.

The method described above is not only useful in preparing milk or cream for churning, but likewise in making ice cream mix or condensed milk.

In the manufacture of butter and soft cheese, such as cottage cheese or cream cheese, a combination of diketones and diacetyl added to a strain of milk culture will produce a richness which not only imparts a rich flavor to the product but also improves the keeping quality, removing the danger of deterioration of the finished product which is encountered when only an ordinary commercial culture is used for the same purpose.

The present process is of value also for removing storage and surface flavor from processed dairy products such as winter butter.

*Example 3*

Winter butter is removed from cold storage and placed in a tempering room at approximately 75–80° F. until the butter is pliable enough to be cut into slabs approximately four inches thick. These slabs are placed in the churn and an aqueous solution of diacetyl combined with cultured milk is added to the butter in the ratio of from 50–100 parts per million by weight of diacetyl to the butter, depending on the severity of the storage and surface flavor in the butter. The butter is then worked into a solid mass, the time for which depends on the type of churn used and the temperature of the butter at the time of working. It is important that the added material be completely incorporated into the butter when working is finished. This method produces a butter devoid of storage and surface flavor.

The treated dairy products have not only an improved odor and flavor but have a low bacterial count and a reduced mould count.

In view of the above, it will be seen that the several objects of the invention are achieved and other advantageous results attained.

As many changes could be made in the above methods without departing from the scope of the invention, it is intended that all matter contained in the above description shall be interpreted as illustrative and not in a limiting sense.

We claim:

1. The method of removing foreign odors and objectionable flavors from lacteal products which contain such odors and flavors, which comprises admixing with said lacteal products approximately 50 to 200 parts per million by weight of at least one diketone selected from the group consisting of diacetyl, 2,3-pentadione, 2,3-hexadione, 3,4-hexadione and 3,4-heptadione, agitating the mixture and substantially removing the foreign odor and objectionable flavor therefrom, and then volatilizing substantially all of said diketone from said mixture.

2. The method of removing foreign odors and objectionable flavors from lacteal products which contain such odors and flavors, which comprises admixing with said lacteal product approximately 50 to 200 parts per million by weight of at least one diketone selected from the group consisting of diacetyl, 2,3-pentadione, 2,3-hexadione, 3,4-hexadione and 3,4-heptadione, and a food acid, agitating the mixture and substantially removing the foreign odor and objectionable flavor therefrom, and then volatilizing substantially all of said diketone from said mixture.

3. The method of removing foreign odors and objectionable flavors from cream which contains such odors and flavors, which comprises admixing with said cream approximately 50 to 200 parts per million by weight of at least one diketone selected from the group consisting of diacetyl, 2,3-pentadione, 2,3-hexadione, 3,4-hexadione and 3,4-heptadione, agitating the mixture and substantially removing the foreign odor and objectionable flavor therefrom, and then volatilizing substantially all of said diketone from said mixture.

4. The method of removing foreign odors and objectionable flavors from butter which contains such odors and flavors, which comprises admixing with said butter approximately 50 to 200 parts per million by weight of at least one diketone selected from the group consisting of diacetyl, 2,3-pentadione, 2,3-hexadione, 3,4-hexadione, and 3,4-heptadione, agitating the mixture and substantially removing the foreign odor and objectionable flavor therefrom, and then volatilizing substantially all of said diketone from said mixture.

5. The method of removing foreign odors and objectionable flavors from lacteal products which contain such odors and flavors, which comprises admixing with said lacteal product approximately 50 to 200 parts per million by weight of diacetyl, agitating the mixture and substantially removing the foreign odor and objectionable flavor therefrom, and then volatilizing substantially all of said diacetyl from said mixture.

6. The method of removing foreign odors and objectionable flavors from cream which contains such odors and flavors, which comprises admixing with said cream approximately 50 to 200 parts per million by weight of diacetyl, agitating the mixture and substantially removing the foreign odor and objectionable flavor therefrom, and then volatilizing substantially all of said diacetyl from said mixture.

7. The method of removing foreign odors and objectionable flavors from cream which contains such odors and flavors, which comprises admixing with said cream approximately 50 to 200 parts per million by weight of diacetyl, and a food acid, agitating the mixture and substantially removing the foreign odor and objectionable flavor therefrom, and then volatilizing substantially all of said diacetyl from said mixture.

8. The method of removing foreign odors and objectionable flavors from lacteal products which contain such odors and flavors, which comprises admixing with said lacteal product a chloro antiseptic and then admixing with the resulting product approximately 50 to 200 parts per million by weight of at least one diketone selected from the group consisting of diacetyl, 2,3-pentadione, 2,3-hexadione, 3,4-hexadione and 3,4-heptadione, agitating the mixture and substantially removing the foreign odor and objectionable flavor therefrom, and then volatilizing substantially all of said diketone from said mixture.

9. The method of removing foreign odors and objectionable flavors from cream which contains such odors and flavors, which comprises admixing with said cream a chloro antiseptic and then admixing with the resulting product approximately 50 to 200 parts per million by weight of at least one diketone selected from the group consisting of diacetyl, 2,3-pentadione, 2,3-hexadione, 3,4-hexadione and 3,4-heptadione, agitating the mixture and substantially removing the foreign odor and objectionable flavor therefrom, and then volatilizing substantially all of said diketone from said mixture.

10. The method of removing foreign odors and objectionable flavors from cream which contains such odors and flavors, which comprises admixing with said cream a chloro antiseptic and then admixing with the resulting product approximately 50 to 200 parts per million by weight of diacetyl, agitating the mixture and substantially removing the foreign odor and objectionable flavor therefrom, and then volatilizing substantially all of said diacetyl from said mixture.

11. The method of removing foreign odors and objectionable flavors from lacteal products which contain such odors and flavors, which comprises admixing with said lacteal product a chloramine and then admixing with the resulting product approximately 50 to 200 parts per million by weight of at least one diketone selected from the group consisting of diacetyl, 2,3-pentadione, 2,3-hexadione, 3,4-hexadione and 3,4-heptadione, agitating the mixture and substantially removing the foreign odor and objectionable flavor therefrom, and then volatilizing substantially all of said diketone from said mixture.

12. The method of removing foreign odors and objectionable flavors from cream which contains such odors and flavors, which comprises admixing with said cream a chloramine and then admixing with the resulting product approximately 50 to 200 parts per million by weight of at least one diketone selected from the group consisting of diacetyl, 2,3-pentadione, 2,3-hexadione, 3,4-hexadione and 3,4-heptadione, agitating the mixture and substantially removing the foreign odor and objectionable flavor therefrom, and then volatilizing substantially all of said diketone from said mixture.

13. The method of removing foreign odors and objectionable flavors from cream which contains such odors and flavors, which comprises admixing with said cream a chloramine and then admixing with the resultng product approximately 50 to 200 parts per million by weight of diacetyl, agitating the mixture and substantially removing the foreign odor and objectionable flavor therefrom, and then volatilizing substantially all of said diacetyl from said mixture.

14. The method of removing foreign odors and objectionable flavors from cream which contains such odors and flavors, which comprises admixing with said cream approximately 100 parts per million by weight of diacetyl, agitating the mixture and substantially removing the foreign odor and objectionable flavor therefrom, and then volatilizing substantially all of said diacetyl from said mixture.

15. The method of removing foreign odors and objectionable flavors from cream which contains such odors and flavors, which comprises admixing with said cream chloramine-T and then admixing with the resulting product approximately 100 parts per million by weight of diacetyl, agitating the mixture and substantially removing the foreign odor and objectionable flavor therefrom, and then volatilizing substantially all of said diacetyl from said mixture.

NIELS P. CHRISTENSEN.
ROLAND E. STURHAHN.